(12) United States Patent  
Tachibana

(10) Patent No.: US 8,824,135 B2  
(45) Date of Patent: Sep. 2, 2014

(54) FUNCTION EXPANDING APPARATUS AND ELECTRONIC APPARATUS SYSTEM

(75) Inventor: Kenji Tachibana, Nagano (JP)

(73) Assignee: Sony Corporation, Tokyo (JP)

( * ) Notice: Subject to any disclaimer, the term of this patent is extended or adjusted under 35 U.S.C. 154(b) by 1 day.

(21) Appl. No.: 13/312,009

(22) Filed: Dec. 6, 2011

(65) Prior Publication Data

US 2012/0155014 A1 Jun. 21, 2012

(30) Foreign Application Priority Data

Dec. 17, 2010 (JP) ............... P2010-281449

(51) Int. Cl.
*H05K 5/00* (2006.01)
*H05K 7/00* (2006.01)
*G06F 3/02* (2006.01)
*G06F 1/16* (2006.01)

(52) U.S. Cl.
CPC ................... *G06F 1/1632* (2013.01)
USPC ............ 361/679.41; 361/679.43; 361/679.44; 361/679.57; 361/679.58; 345/169

(58) Field of Classification Search
USPC ............ 361/679.01, 679.02, 679.08, 679.09, 361/679.3, 679.4, 679.41–679.45, 361/679.55–679.59; 345/156, 157, 168, 345/169
See application file for complete search history.

(56) References Cited

U.S. PATENT DOCUMENTS

| | | | |
|---|---|---|---|
| 2003/0040216 A1* | 2/2003 | Youn ........................... 439/534 |
| 2005/0047104 A1* | 3/2005 | Grunow et al. ............... 361/801 |
| 2006/0082959 A1* | 4/2006 | DeLuga et al. ............... 361/683 |
| 2009/0213536 A1* | 8/2009 | Lewandowski et al. . 361/679.43 |

FOREIGN PATENT DOCUMENTS

JP 2010-020506 A 1/2010

* cited by examiner

*Primary Examiner* — Jenny L Wagner
*Assistant Examiner* — Jerry Wu
(74) *Attorney, Agent, or Firm* — Sony Corporation

(57) ABSTRACT

Disclosed herein is a function expanding apparatus, including: a mounting base section adapted to receive an information processing apparatus placed thereon solely or together with a battery mounted on a bottom face of the information processing apparatus; and a first connector movable in response to presence or absence of the battery until the first connector is connected to the information processing apparatus.

15 Claims, 12 Drawing Sheets

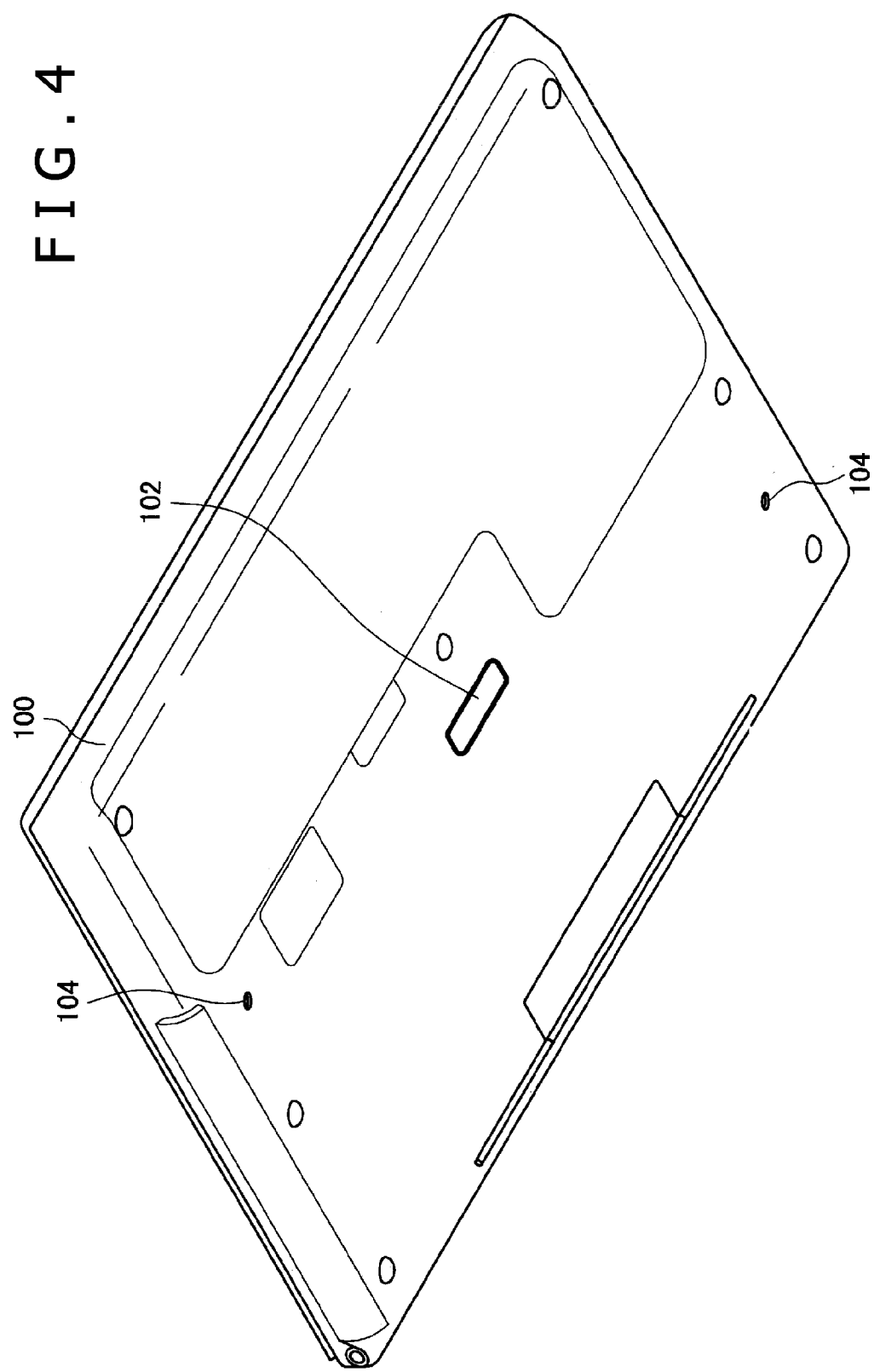

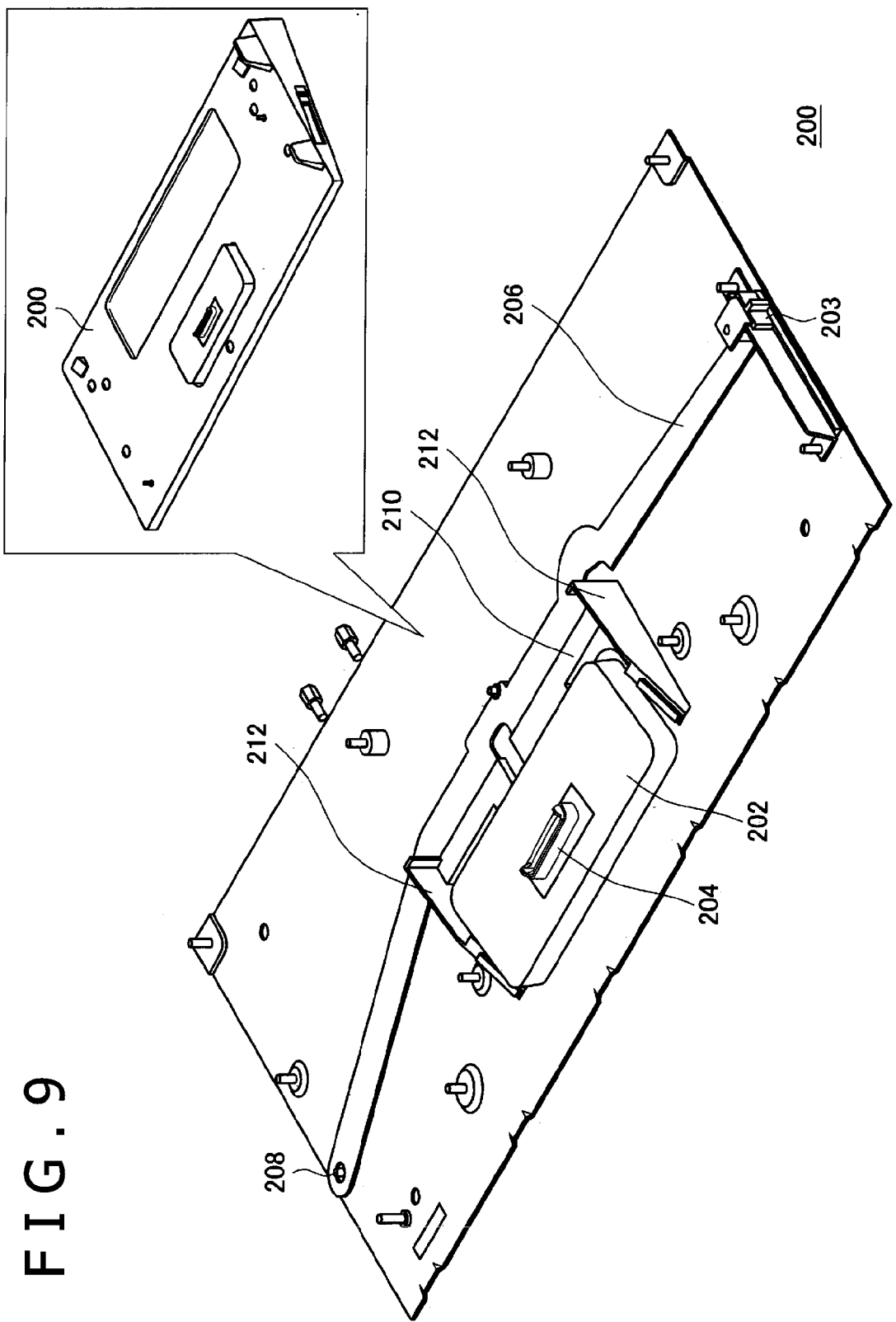

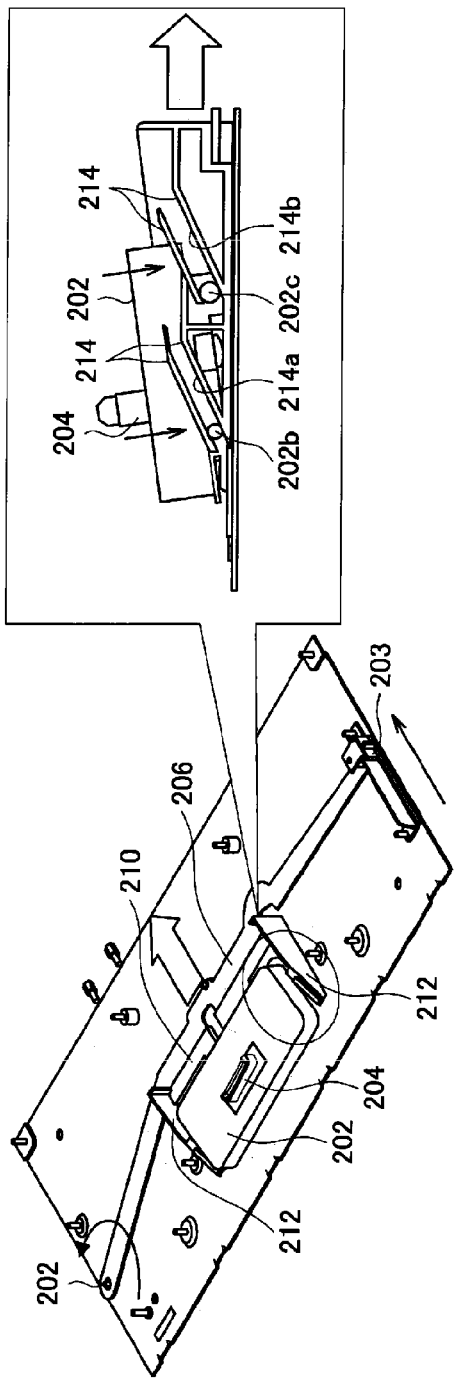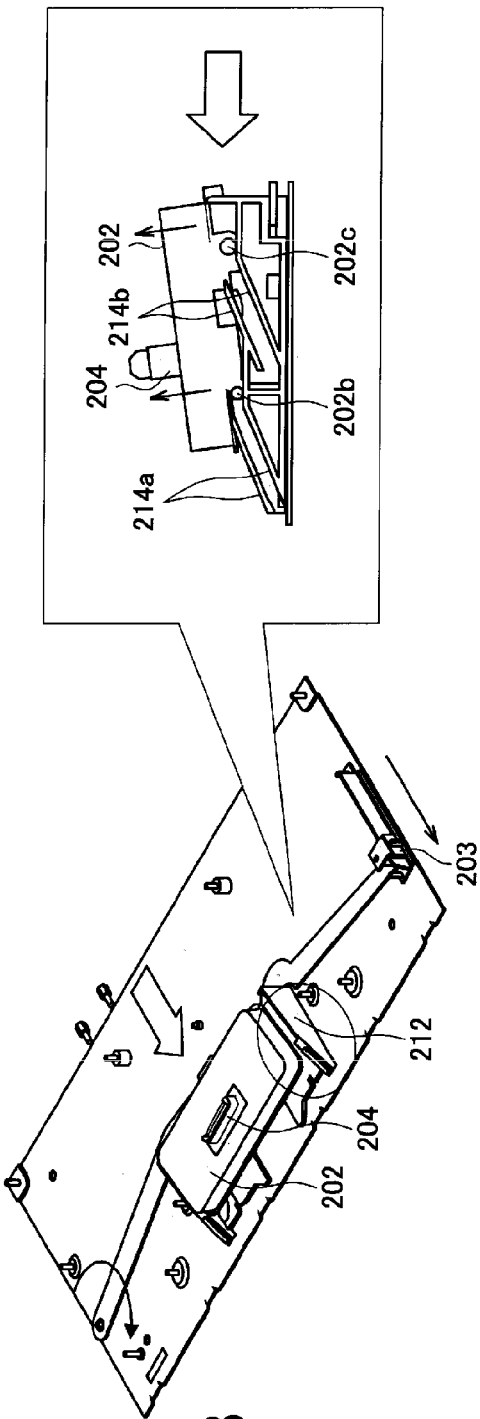

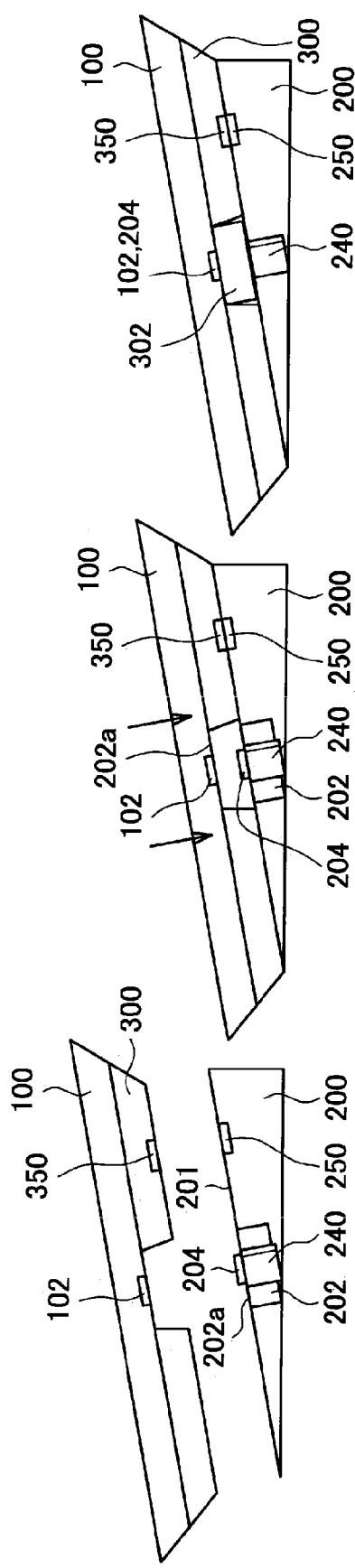
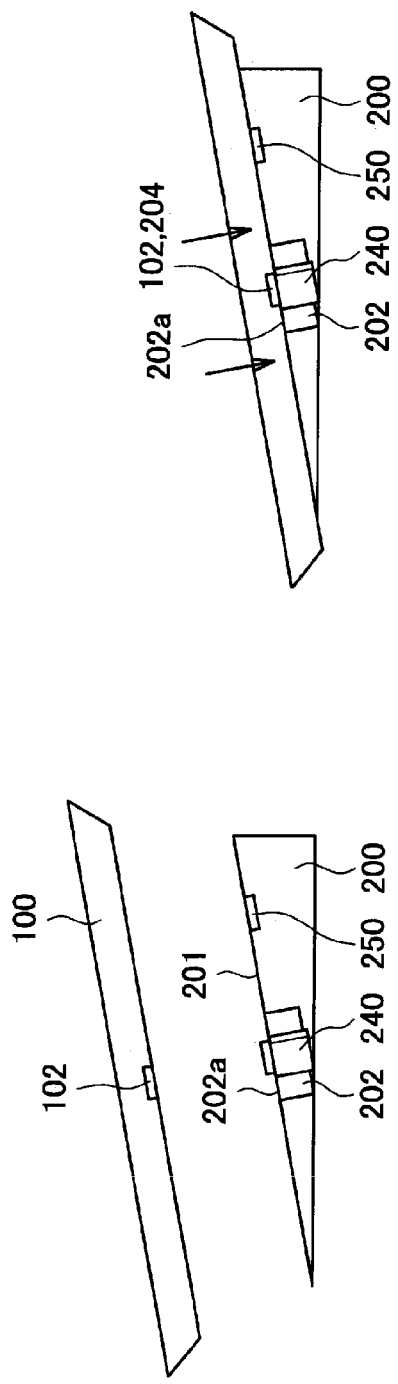
FIG. 12A
FIG. 12B

FUNCTION EXPANDING APPARATUS AND ELECTRONIC APPARATUS SYSTEM

CROSS-REFERENCE TO RELATED APPLICATION

The present application claims priority from Japanese Patent Application No. JP 2010-281449 filed in the Japanese Patent Office on Dec. 17, 2010, the entire content of which is incorporated herein by reference.

BACKGROUND

The technology disclosed herein relates to a function expanding apparatus and an electronic apparatus system.

A docking apparatus (hereinafter referred to as function expanding apparatus) which can expand a function of an apparatus (hereinafter referred to as information processing apparatus) such as a notebook type personal computer is known and disclosed, for example, in Japanese Patent Laid-Open No. 2010-20506. The function expanding apparatus includes a connector mechanically and electrically connectable to a connector of the information processing apparatus.

SUMMARY

Incidentally, to a portable information processing apparatus such as, for example, a notebook type personal computer, a separate battery is sometimes connected in order to increase the capacity of a cell. Such a battery as mentioned above sometimes has a shape of a plane table and is mounted such that it covers over a substantially overall area of the bottom face of an information processing apparatus.

However, in the case where such a plane table type battery is mounted on the bottom face of an information processing apparatus, if the information processing apparatus is placed on a function expanding apparatus while it is in a state in which a battery is mounted thereon, then such a situation that a connector of the information processing apparatus cannot be connected to the function expanding apparatus occurs.

Therefore, it is desirable to provide a novel and improved function expanding apparatus and electronic apparatus system wherein an information processing apparatus and the function expanding apparatus can be electrically connected to each other irrespective of whether or not a battery is mounted on the bottom face of the information processing apparatus.

According to an embodiment of the disclosed technology, there is provided a function expanding apparatus, including: a mounting base section adapted to receive an information processing apparatus placed thereon solely or together with a battery mounted on a bottom face of the information processing apparatus; and a first connector movable in response to presence or absence of the battery until the first connector is connected to the information processing apparatus.

The function expanding apparatus may further include an actuator adapted to move the first connector; and a sensor adapted to detect whether or not the battery is mounted on the information processing apparatus; the actuator moving, when it is detected by the sensor that the battery is mounted on the information processing apparatus, the first connector until the first connector is connected to the information processing apparatus.

Or, the function expanding apparatus may further include an operation section adapted to move the first connector in response to an operation thereof by a user.

Or else, the function expanding apparatus may configured such that it further includes a spring adapted to bias the first connector in an upward direction, and that the first connector is connected, when the information processing apparatus in a state in which the battery is mounted thereon is placed on the mounting base section, to the information processing apparatus in a state in which the first connector is biased in the upward direction by the spring, but is moved, when the information processing apparatus is placed solely on the mounting base section, downwardly by own weight of the information processing apparatus and is connected to the information processing apparatus.

The function expanding apparatus may be configured such that the battery has an opening provided at a position thereof corresponding to the first connector, and when the information processing apparatus in the state in which the battery is mounted thereon is placed on the mounting base section, the first connector is connected to the information processing apparatus through the opening.

According to another embodiment of the disclosed technology, there is provided an electronic apparatus system, including: an information processing apparatus having a second connector provided on a bottom face thereof; a battery adapted to be mounted on the bottom face of the information processing apparatus; and a function expanding apparatus including a mounting base section adapted to receive the information processing apparatus placed thereon solely or together with the battery mounted on the information processing apparatus, and a first connector movable in response to presence or absence of the battery until the second connector is connected to the first connector.

The function expanding apparatus may further include an actuator adapted to move the first connector; and a sensor adapted to detect whether or not the battery is mounted on the information processing apparatus; the actuator moving, when it is detected by the sensor that the battery is mounted on the information processing apparatus, the first connector until the first connector is connected to the second connector.

Or, the function expanding apparatus may further include an operation section adapted to move the first connector in response to an operation thereof by a user.

Or else, the function expanding apparatus may further include a spring adapted to bias the first connector in an upward direction, and the first connector is connected, when the information processing apparatus in a state in which the battery is mounted thereon is placed on the mounting base section, to the second connector in a state in which the first connector is biased in the upward direction by the spring, but is moved, when the information processing apparatus is placed solely on the mounting base section, downwardly by own weight of the information processing apparatus and is connected to the second connector.

The information processing apparatus may include a ground terminal adapted to be connected to the battery or the function expanding apparatus, and the battery and the function expanding apparatus may include a ground pin adapted to be connected to the ground terminal of the informant processing apparatus.

The battery may have an opening provided at a position thereof corresponding to the second connector, and when the information processing apparatus in the state in which the battery is mounted thereon is placed on the mounting base section, the first connector may be connected to the second connector through the opening.

With the function expanding apparatus and the electronic apparatus system, the information processing apparatus and the function expanding apparatus can be electrically connected to each other irrespective of whether or not the battery is mounted on the bottom face of the information processing apparatus.

BRIEF DESCRIPTION OF THE DRAWINGS

FIG. 4 is a perspective view of the bottom of the personal computer as viewed from below;

FIGS. 9, 10A and 10B are schematic views showing a mechanism for moving a connector installation section upwardly and downwardly by an operation of a lever;

FIGS. 12A and 12B are schematic right side elevational views showing a configuration of an electronic apparatus system according to a third embodiment of the disclosed technology.

DETAILED DESCRIPTION OF THE PREFERRED EMBODIMENTS

In the following, preferred embodiments of the disclosed technology are described with reference to the accompanying drawings. It is to be noted that, in the present specification and drawings, components having similar function are denoted by like reference symbols to avoid redundancy.

It is to be noted that the description is given in the following order:

1. First Embodiment
   (1) Example of the Configuration of the Electronic Apparatus System
   (2) Particular Example of the Configuration of Connection between the Personal Computer and the Port Replicator
2. Second Embodiment
3. Third Embodiment

Figure 1:
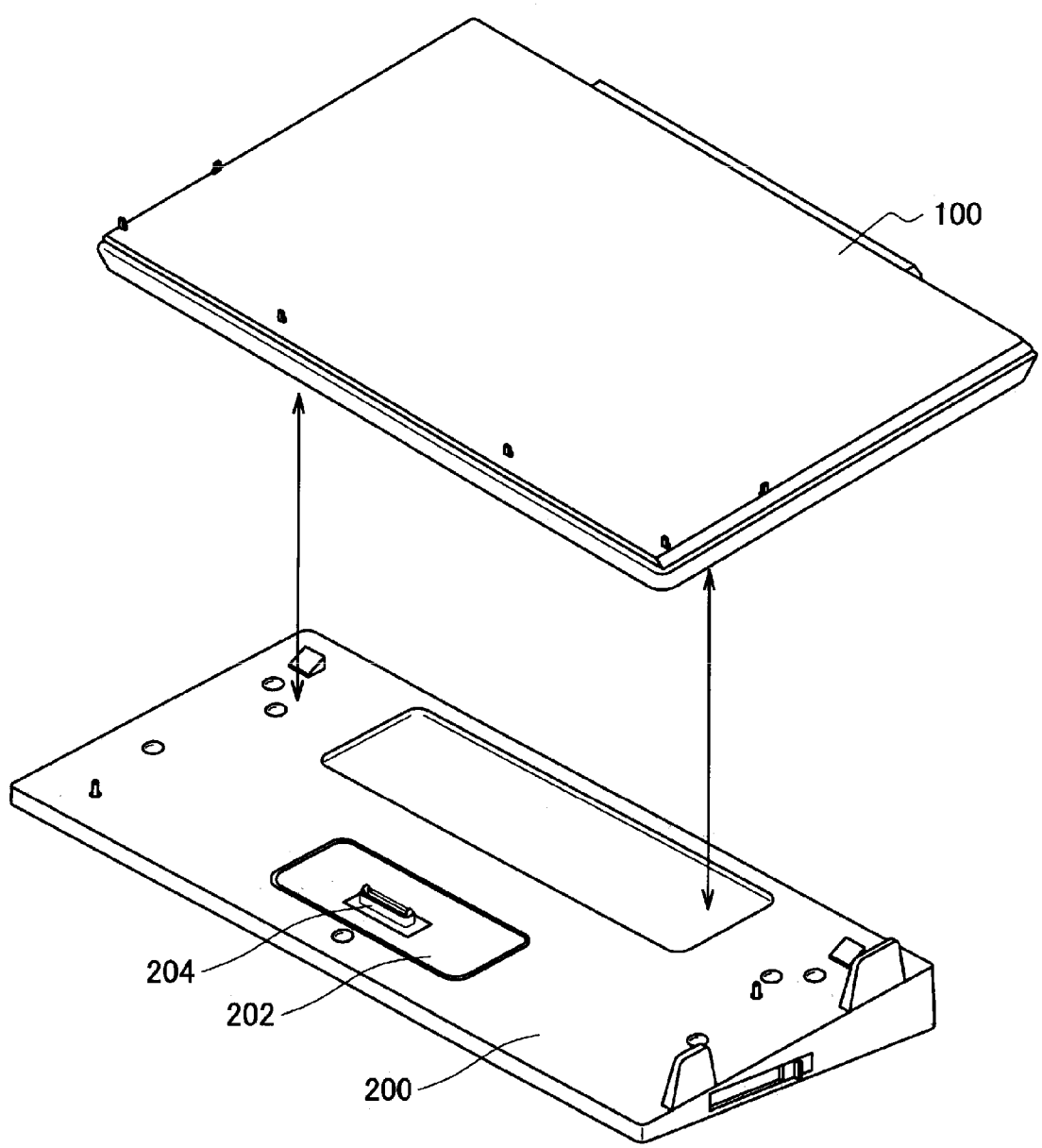
FIG. 1 is a schematic view showing a personal computer and a port replicator in an electronic apparatus system according to a first embodiment of the disclosed technology.

1. First Embodiment (1) Example of the Configuration of the Electronic Apparatus System First, a configuration of an electronic apparatus system according to a first embodiment of the disclosed technology is described with reference to FIGS. 1, 2A and 2B. The electronic apparatus system according to the present embodiment includes a notebook type personal computer (PC) 100, a port replicator (PR) 200 which is a function expanding apparatus, and a battery 300. FIG. 1 particularly shows the personal computer 100 and the port replicator 200 in the electronic apparatus system.

The personal computer 100 is placed in a folded state on the port replicator 200 and is electrically connected to the port replicator 200 through a connector. The port replicator 200 includes a plurality of terminals such as a USB terminal on a rear face thereof and functions as a function expanding apparatus for expanding functions of the personal computer 100.

Figure 2A:
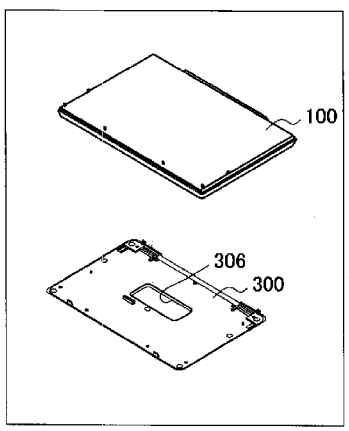
FIG. 2 is a schematic view illustrating a manner in which the personal computer is placed on the port replicator in a state in which a battery is mounted on the personal computer.
Figure 2B:
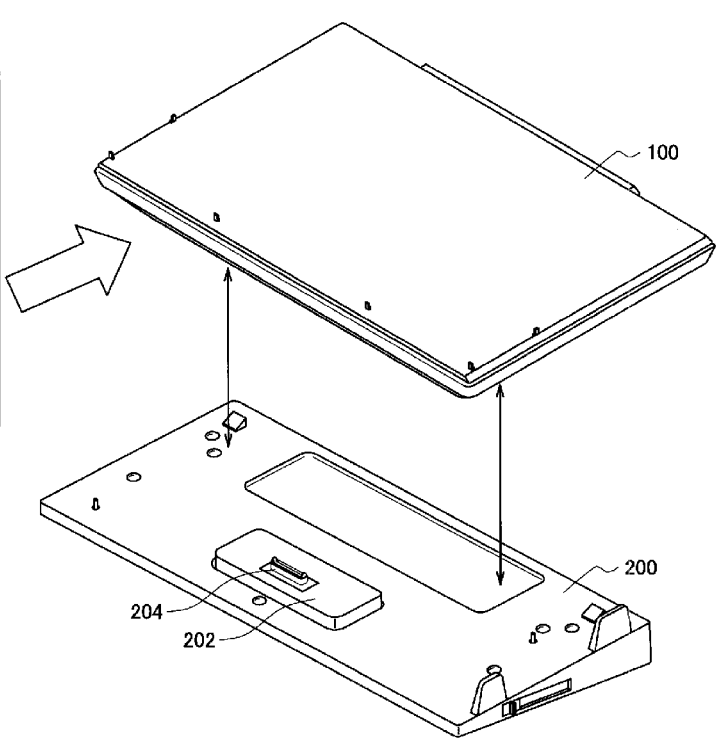

The battery 300 of a thin plate shape can be placed over a substantially overall area of the bottom face of the personal computer 100. FIGS. 2A and 2B illustrate a manner in which the personal computer 100 is placed on the port replicator 200 in a state in which the battery 300 is mounted on the personal computer 100. Here, FIG. 2A shows the personal computer 100 and the battery 300 placed on the bottom face of the personal computer 100. Meanwhile, FIG. 2B illustrates a manner in which the personal computer 100 is placed on an upper face or mounting base section 201 of the port replicator 200 in a state in which the battery 300 is mounted on the personal computer 100.

Figure 3A:
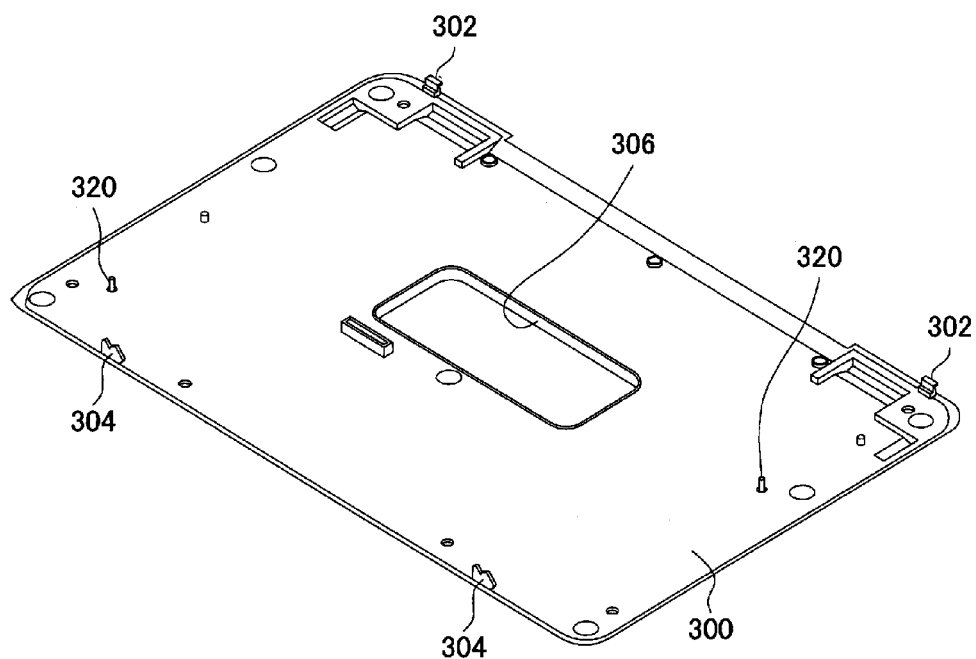
FIGS. 3A and 3B are schematic views showing a configuration of the battery.
Figure 3B:
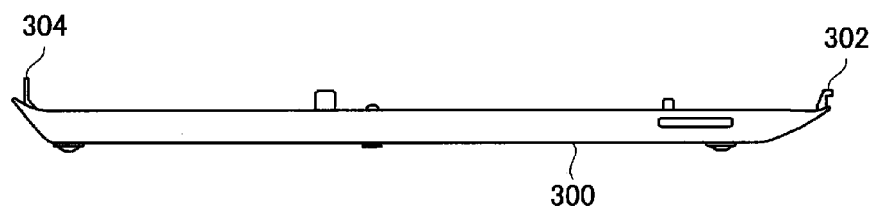

FIGS. 3A and 3B show a configuration of the battery 300. More particularly, FIG. 3A shows the battery 300 as viewed from obliquely upwardly, and FIG. 3B shows the battery 300 as viewed from the right side. Referring to FIGS. 3A and 3B, the battery 300 has a plane table shape substantially same as that of the personal computer 100. The battery 300 is mounted on the bottom face of the personal computer 100 by engaging hooks 302 shown in FIG. 3B with engaging portions on a rear face of the personal computer 100 and engaging hooks 304 with front portions of the personal computer 100.

By mounting the thin battery 300 having a plane table shape same as that of the personal computer 100 on the personal computer 100 in this manner, the cell capacity of the personal computer 100 can be increased without damaging the operability and the maneuverability.

FIG. 4 shows the bottom face of the personal computer 100 as viewed from obliquely downwardly. Referring to FIG. 4, a connector 102 for being electrically connected to the port replicator 200 is provided on the bottom face of the personal computer 100. Further, ground terminals 104 for being connected to the port replicator 200 or the battery 300 are provided on the bottom face of the personal computer 100.

As described above with reference to FIGS. 2A and 2B, in the present embodiment, the personal computer 100 is placed on the port replicator 200 in the state in which the battery 300 is mounted on the personal computer 100. Therefore, in the present embodiment, the personal computer 100 and the port replicator 200 are configured such that they can be electrically connected to each other in any of a state in which the personal computer 100 is placed solely on the port replicator 200 and another state in which the personal computer 100 in the state in which the battery 300 is coupled thereto is placed on the port replicator 200.

Figure 5A:
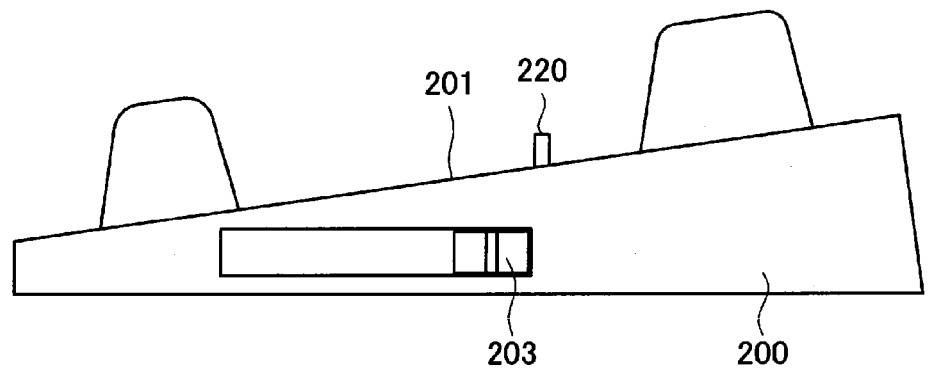
FIGS. 5A, 5B, 6A and 6B are schematic views showing a configuration of the port replicator.

(2) Particular Example of the Configuration of Connection between the Personal Computer and the Port Replicator In the following, electric connection between the personal computer 100 and the port replicator 200 is described in detail with reference to FIGS. 2A to 7B. FIGS. 5A to 6B show a configuration of the port replicator 200, and particularly FIGS. 5A and 6A show the port replicator 200 as viewed from the right side while FIGS. 5B and 6B show the port replicator 200 as viewed from obliquely upwardly.

Figure 5B:
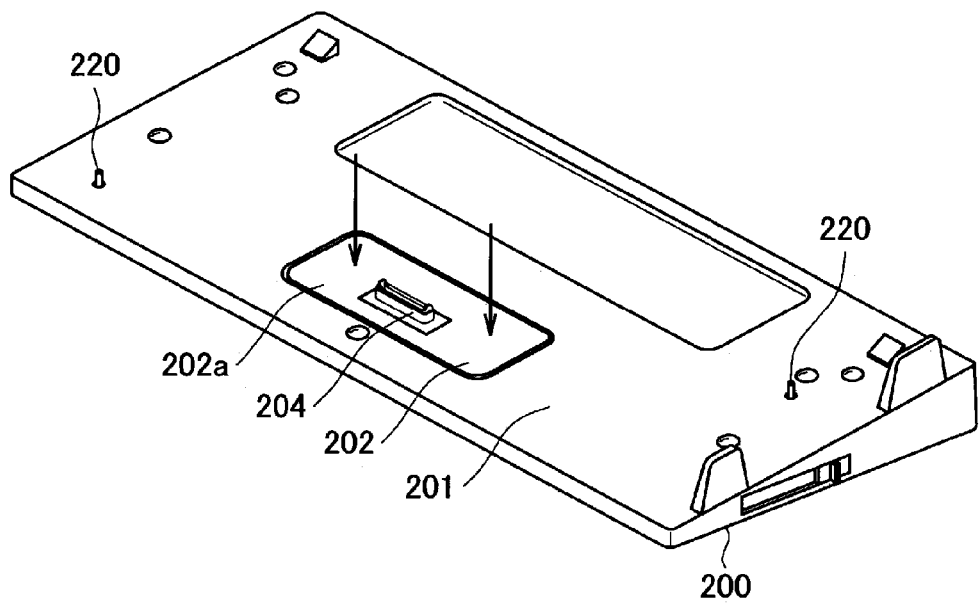
Figure 6A:
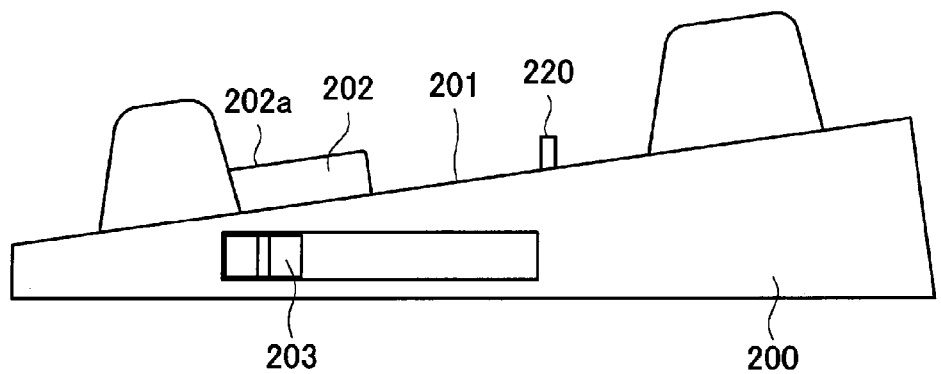
Figure 6B:
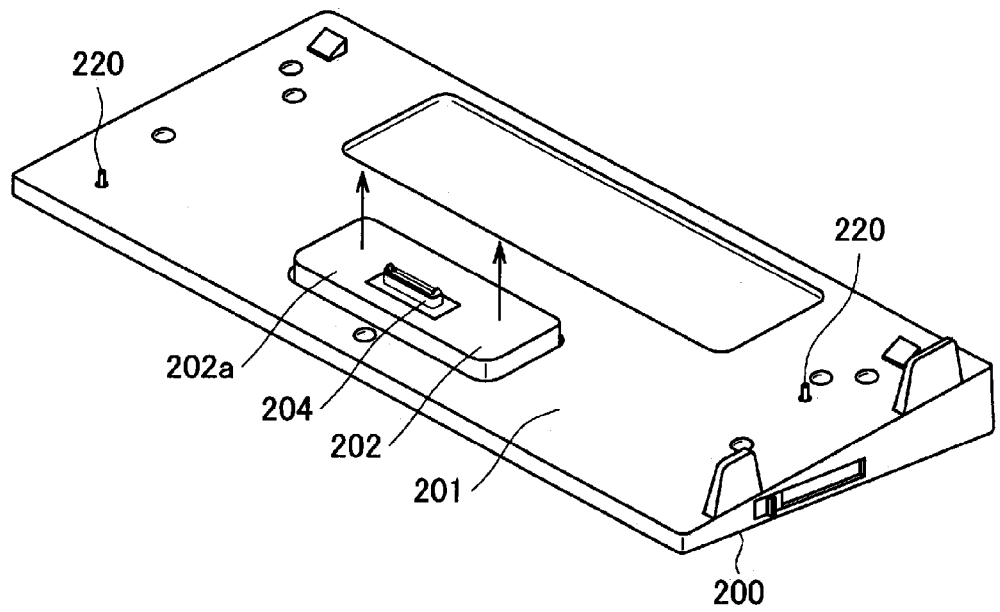

As seen in FIGS. 5B and 6B, a connector installation section 202 is provided on an upper face of the port replicator 200, and a connector 204 for being connected to the connector 102 of the personal computer 100 is provided on the connector installation section 202. As an example, the connector 204 is a male type connector, and the connector 102 is a female type connector.

The connector installation section 202 is configured for upward and downward movement by an operation of a user. FIGS. 5A and 5B show the connector installation section 202 moved down to a position same as that of the upper face 201 of the port replicator 200. Meanwhile, FIGS. 6A and 6B show the connector installation section 202 moved up to a position higher than that of the upper face 201 of the port replicator 200.

As seen from the right side elevational views of FIGS. 5A and 6B, a lever 203 for moving the connector installation section 202 upwardly and downwardly is provided on a side face of the port replicator 200. The lever 203 is configured for sliding movement in the forward and backward direction of the port replicator 200, that is, in the leftward and rightward direction in FIGS. 5A and 6A.

If the user moves the lever 203 rightwardly as seen in FIG. 5A, then the connector installation section 202 is moved down until an upper face 202a of the connector installation section 202 and the upper face 201 of the port replicator 200 lie substantially in flush with each other.

On the other hand, if the user moves the lever 203 leftwardly as seen in FIG. 6A, then the connector installation section 202 is moved upwardly until the upper face 202a of the connector installation section 202 comes to a position higher than that of the mounting base section 201 of the port replicator 200. Consequently, the connector installation section 202 projects upwardly farther than the mounting base section 201 of the port replicator 200. Here, the upward projection amount of the connector installation section 202 corresponds to the thickness of the battery 300.

Meanwhile, an opening 306 of a shape corresponding to the shape of the connector installation section 202 is provided at a position of the battery 300 corresponding to the connector installation section 202 such that it extends through the battery 300 as seen in FIGS. 2A and 3A.

If the personal computer 100 is placed solely on the port replicator 200, then the position of the connector installation section 202 is set in such a state as seen in FIGS. 5A and 5B. Consequently, the bottom face of the personal computer 100 is contacted with the mounting base section 201 of the port replicator 200 and the upper face 202a of the connector installation section 202, and the connector 102 is connected to the connector 204.

On the other hand, if the personal computer 100 is placed on the port replicator 200 in the state in which the personal computer 100 is combined with the battery 300, then the position of the connector installation section 202 is set to such a state as seen in FIGS. 6A and 6B. Consequently, if the personal computer 100 in the state in which the battery 300 is mounted thereon is placed on the port replicator 200, then the connector installation section 202 extends through the opening 306 and the connector 102 of the personal computer 100 is connected the connector 204 of the port replicator 200.

Accordingly, in both of a state in which the personal computer 100 is placed solely and another state in which the personal computer 100 on which the battery 300 is mounted is placed, the connector 102 of the personal computer 100 and the connector 204 of the port replicator 200 can be connected to each other by changing over the heightwise position of the connector installation section 202.

Figure 7A:
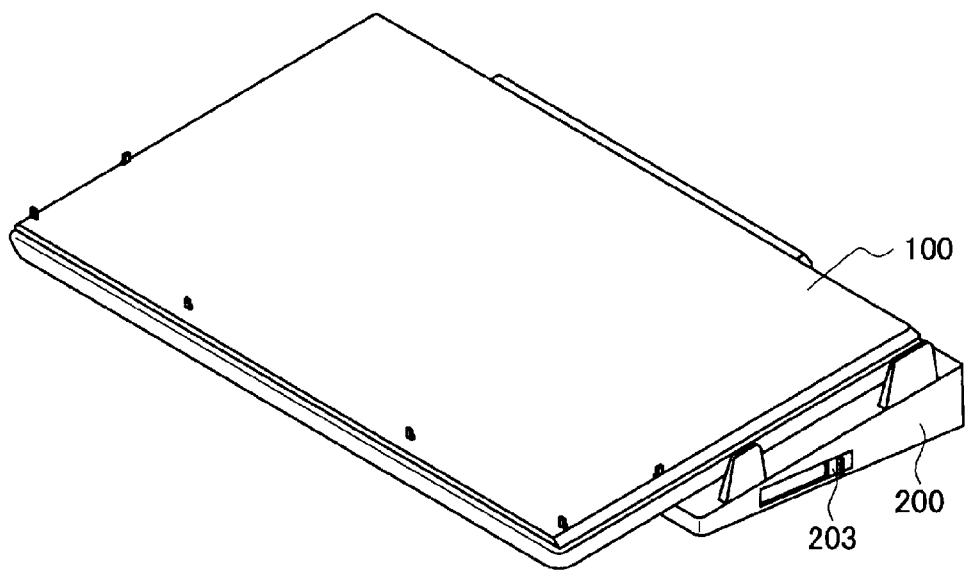
FIGS. 7A and 7B are schematic views showing the electronic apparatus system in a state in which the personal computer is placed solely on the port replicator.
Figure 7B:
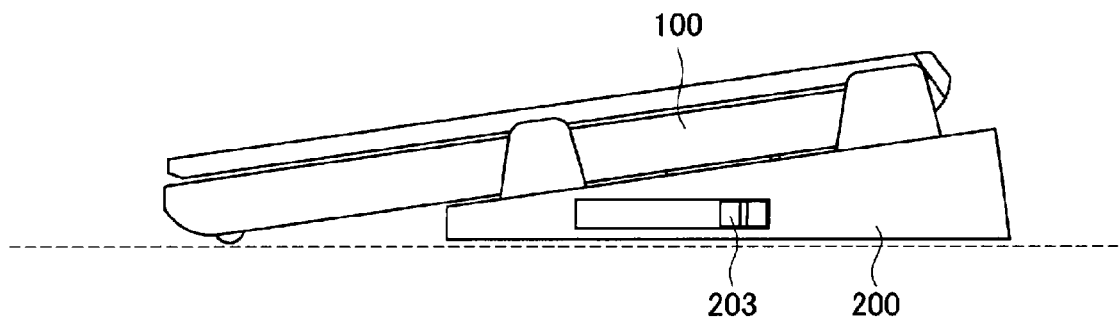

FIGS. 7A and 7B show the electronic apparatus system in a state in which the personal computer 100 is placed solely on the port replicator 200. More particularly, FIG. 7A shows a perspective view of the electronic apparatus system and FIG. 7B shows a right side elevational view of the electronic apparatus system. As described hereinabove, in the state illustrated in FIGS. 7A and 7B, the position of the connector installation section 202 is set in the state illustrated in FIGS. 5A and 5B. Accordingly, the connector 102 and the connector 204 are connected to each other by placing the personal computer 100 on the port replicator 200.

Figure 8A:
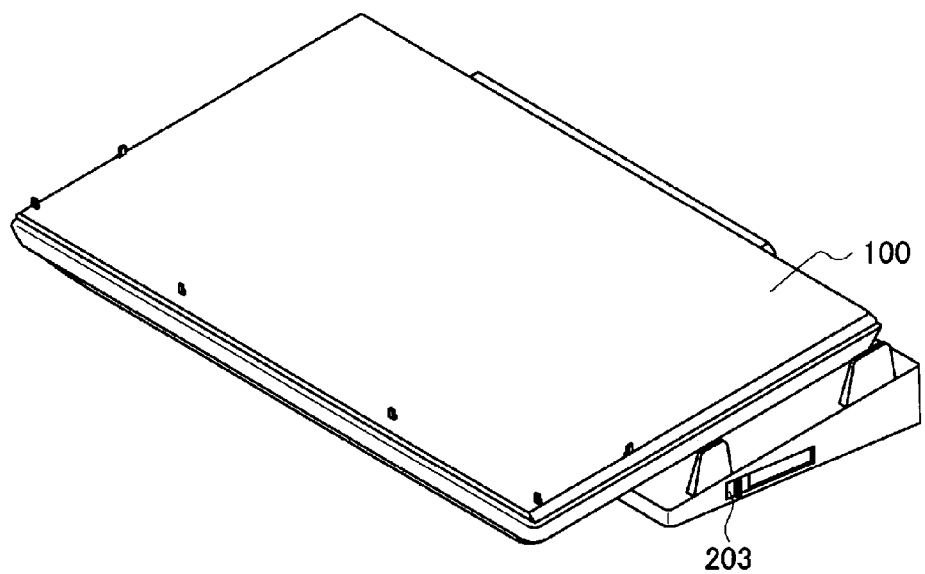
FIGS. 8A and 8B are schematic views showing the personal computer placed on the port replicator in a state in which the personal computer and the battery are combined.
Figure 8B:
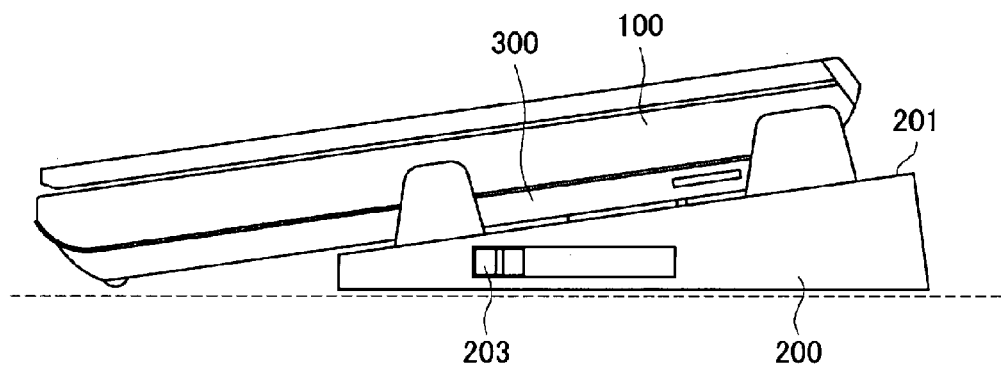

FIGS. 8A and 8B show the electronic apparatus system in a state in which the personal computer 100 combined with the battery 300 is placed on the port replicator 200. More particularly, FIG. 8A shows a perspective view of the electronic apparatus system and FIG. 8B shows a right side elevational view of the electronic apparatus system. In the state in which the battery 300 is mounted on the personal computer 100 as seen in FIG. 8B, the bottom face of the personal computer 100 is displaced by a distance corresponding to the thickness of the battery 300 from the mounting base section 201 of the port replicator 200. Thereupon, in the state illustrated in FIGS. 8A and 8B, the position of the connector installation section 202 is set to a state illustrated in FIGS. 5A and 5B as described hereinabove. Since, in the state illustrated in FIGS. 8A and 8B, the connector installation section 202 projects upwardly by an amount corresponding to the thickness of the battery 300, the connector 102 of the personal computer 100 and the connector 204 of the port replicator 200 can be connected to each other with certainty.

FIGS. 9, 10A and 10B show a mechanism for moving the connector installation section 202 upwardly and downwardly by an operation of the lever 203. More particularly, FIG. 9 shows an internal mechanism of the port replicator 200 with an upper housing removed. Referring to FIG. 9, the lever 203 is connected to an arm 206. The arm 206 is coupled at an end portion thereof remote from the lever 203 to an arm pivot shaft 208 such that it can be pivoted around the arm pivot shaft 208.

A slide part 210 is connected to the arm 206. If the lever 203 moves in the forward or backward direction, then the arm 206 is pivoted around the arm pivot shaft 208 in response to the movement of the lever 203. The slide part 210 moves in the forward or backward direction of the port replicator 200 similarly to the lever 203 in response to the pivoting movement of the arm 206.

The slide part 210 has a pair of left and right arm portions 212 extending to the opposite sides of the connector installation section 202. A pair of ribs 214 are provided on each of the arm portions 212 such that they extend toward the connector installation section 202.

FIGS. 10A and 10B illustrate the shape of the ribs 214 provided on one of the arm portions 212 and upward and downward movements of the connector installation section 202. More particularly, FIG. 10A shows the connector installation section 202 in the downwardly moved state corresponding to FIGS. 5A and 5B, and FIG. 10B shows the connector installation section 202 moved upwardly corresponding to FIGS. 6A and 6B.

Referring to FIGS. 10A and 10B, two inclined faces 214a and 214b are provided. Further, two cylindrical projections 202b and 202c are provided on a side face of the connector installation section 202. Here, the projection 202b is received by the inclined face 214a while the projection 202c is received by the inclined face 214b.

In the state illustrated in FIG. 10A, the projections 202b and 202c are positioned at a lower portion of the inclined faces 214a and 214b, respectively. In this state, the connector installation section 202 is positioned at the lowest position and the upper face 202a of the connector installation section 202 and the mounting base section 201 of the port replicator 200 are substantially in flush with each other as described hereinabove.

If the user pulls the lever 203 to the front side of the port replicator 200, that is, to this side in the state illustrated in FIG. 10A, then also the slide part 210 moves forwardly of the port replicator 200, that is, toward this side in response to the pivoting movement of the arm 206. At this time, the projections 202b and 202c ride on the inclined faces 214a and 214b in response to the movement of the inclined faces 214a and 214b, respectively, and move in an upward direction. Then, in a state in which the lever 203 is positioned on the front side of the port replicator 200, that is, on this side, or in other words, in the state illustrated in FIGS. 6A and 6B, the projections 202b and 202c are placed on a flat portion at an upper end of the inclined faces 214a and 214b, respectively. Consequently, the connector installation section 202 is in a state lifted upwardly by an amount corresponding to the thickness of the battery 300.

On the other hand, if the lever 203 is pulled to the rear side of the port replicator 200, that is, toward the interior side in the state illustrated in FIG. 10B, then also the slide part 210 moves to the rear side of the port replicator 200, that is, toward the interior side, in response to pivoting movement of the arm 206. At this time, the projections 202b and 202c ride down on the inclined faces 214a and 214b in response to the movement of the inclined faces 214a and 214b, respectively, and move downwardly. Then, in a state in which the arm pivot shaft 208 is positioned on the rear side of the port replicator 200 or interior side as seen in FIGS. 5A and 5B, the projections 202b and 202c are positioned at the lowermost portion of the inclined faces 214a and 214b, respectively. Consequently, the position of the connector installation section 202 is lowered and the upper face 202a of the connector installation section 202 is positioned in flush with the mounting base section 201 of the port replicator 200.

The position of the connector installation section 202 can be changed over by an operation of the lever 203 in such a manner as described above through the mechanism shown in FIGS. 9, 10A and 10B.

Now, connection of the ground terminals of the personal computer 100, port replicator 200 and battery 300 is described. As described hereinabove, the ground terminals 104 are provided on the bottom face of the personal computer 100. The ground terminals 104 are formed from a metal plate provided on the inner side with respect to the surface of a housing which configures the bottom face of the personal computer 100. Further, as shown in FIGS. 5A to 6B, ground pins 220 are provided at positions of the upper face 201 of the port replicator 200 corresponding to the ground terminals 104. The ground pins 220 are each biased in an upward direction by a compression coil spring not shown.

If the personal computer 100 is placed on the port replicator 200, then the ground terminals 104 contact with an end of the ground pins 220 and the coil springs which bias the ground pins 220 in the upward direction are compressed. Consequently, the ground pins 220 are contacted at the end thereof closely with the ground terminals 104 by the biasing force of the compression coil springs, and the grounds, that is, the ground potentials, of the personal computer 100 and the port replicator 200 are connected commonly.

Further, as shown in FIGS. 3A and 3B, ground pins 320 are provided at positions also on an upper face of the battery 300 corresponding to the ground terminals 104 of the personal computer 100. Similarly to the ground pins 220, also the ground pins 320 are biased in an upward direction by compression coil springs. If the battery 300 is mounted on the personal computer 100, then the ground terminals 104 contact with an end of the ground pins 320 and the coil springs which bias the ground pins 320 in the upward direction are compressed. Consequently, the ground pins 320 are closely contacted at the ends thereof with the ground terminals 104 by the biasing force of the compression coil springs, and the grounds or ground potentials of the personal computer 100 and the battery 300 are connected commonly.

Also on the bottom face of the battery 300, ground terminals 330 are provided at positions corresponding to the ground terminals 104 similarly to the ground terminals 104 of the personal computer 100. The ground terminals 330 on the bottom face of the battery 300 are electrically connected to the ground pins 320 on the upper face of the battery 300. If the personal computer 100 and the battery 300 in a combined state are placed on the port replicator 200, then the ground terminals 330 on the bottom face of the battery 300 are contacted with an end of the ground pins 220 of the port replicator 200 and the coil springs which bias the ground pins 220 in the upward direction are compressed. Consequently, the ground pins 220 are closely contacted at the ends thereof with the ground terminals 330 on the bottom face of the battery 300 by the biasing force of the compression coil springs, and the grounds or ground potentials of the battery 300 and the port replicator 200 are connected commonly. Accordingly, the grounds or ground potentials of the personal computer 100, battery 300 and port replicator 200 are connected commonly. In this manner, by providing the ground pins 320 and the ground terminals on the battery 300, similarly as in the case where the personal computer 100 is placed on the port replicator 200, even in the case where the personal computer 100 in the state in which the battery 300 is combined with the bottom face thereof is placed on the port replicator 200, connection of the grounds can be established.

As described above, with the first embodiment, the connector installation section 202 provided on the port replicator 200 is mounted for upward and downward movement by a user operation to set the connector installation section 202 to a different height. Consequently, in both of a case where the personal computer 100 is placed solely on the battery 300 and another case where the personal computer 100 in the condition in which the battery 300 is mounted thereon is placed on the port replicator 200, the personal computer 100 and the port replicator 200 can be electrically connected to each other.

2. Second Embodiment

Figure 11A:
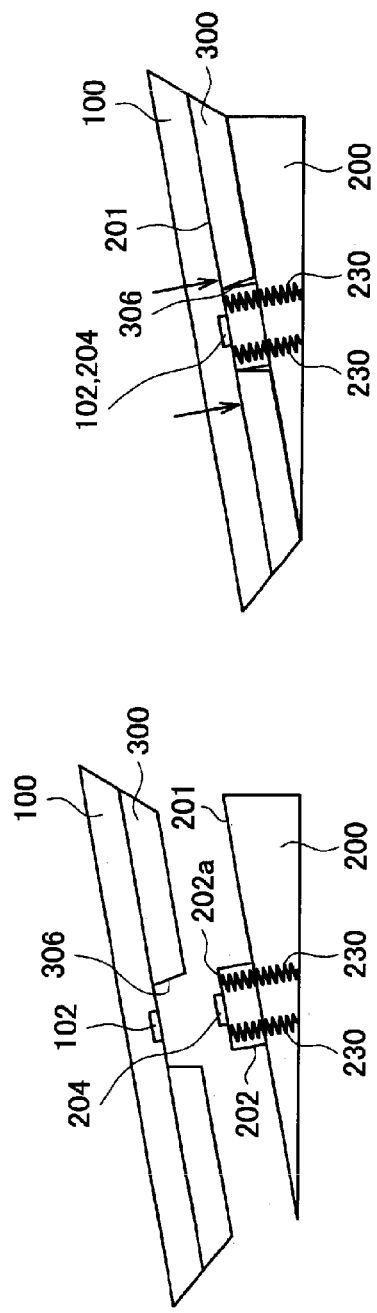
FIGS. 11A and 11B are schematic right side elevational views showing a configuration of an electronic apparatus system according to a second embodiment of the disclosed technology.
Figure 11B:
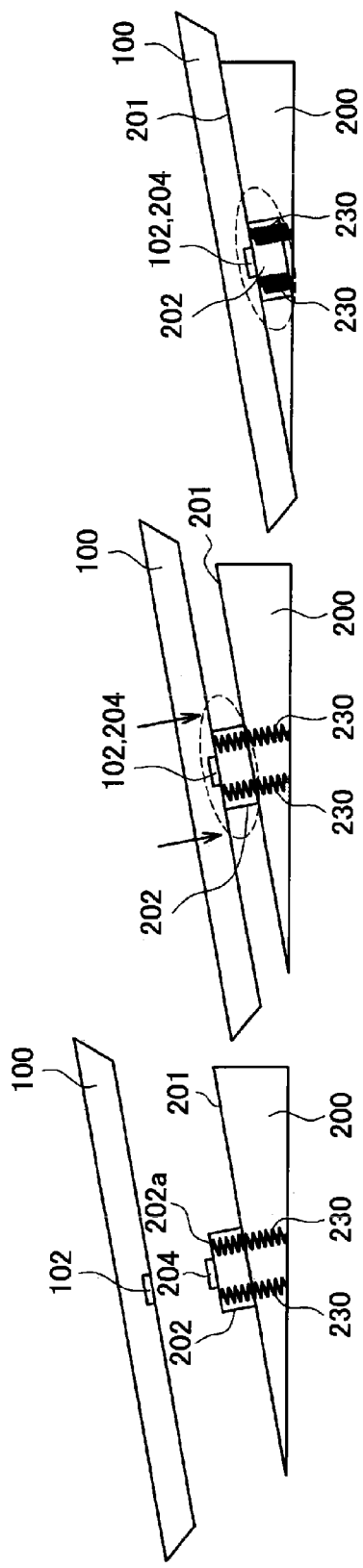

Now, a second embodiment of the disclosed document is described. FIGS. 11A and 11B show a configuration of an electronic apparatus system according to the second embodiment as viewed from the right side. More particularly, FIG. 11A shows the electronic apparatus system in the case where a personal computer 100 in the state in which a battery 300 is mounted thereon is placed on a port replicator 200, and FIG. 11B shows the electronic apparatus system in the case where the personal computer 100 is placed solely on the port replicator 200.

In the second embodiment, a compression coil spring 230 for biasing the connector installation section 202 in an upward direction is provided. Therefore, in a state in which the personal computer 100 is not placed on the port replicator 200 as seen on the left side in FIG. 11A, the connector installation section 202 biased in the upward direction by the biasing force of the compression coil spring 230 projects upwardly farther than the mounting base section 201 of the port replicator 200. Thereupon, the projection amount of the connector installation section 202 corresponds to the thickness of the battery 300.

The right side figure of FIG. 11A illustrates a state in which the personal computer 100 in the state in which the battery 300 is mounted thereon is placed on the port replicator 200. At this time, since the connector installation section 202 projects by an amount corresponding to the thickness of the battery 300 from the upper face 201 of the port replicator 200, the connector installation section 202 is inserted in the opening 306 of the battery 300 and the connector 102 of the personal computer 100 and the connector 204 of the port replicator 200 are connected to each other.

On the other hand, when the personal computer 100 is placed solely on the port replicator 200 as shown in FIG. 11B, the connector 102 on the bottom face of the personal computer 100 is first contacted with the connector 204 of the connector installation section 202 as shown in the central figure of FIG. 11B, and the connector 102 and the connector installation section 202 are connected to each other. Thereafter, by the own weight of the personal computer 100, the compression coil spring 230 is compressed to push the connector installation section 202 downwardly. Then, as seen from the right side figure in FIG. 11B, the connector installation section 202 is pushed down to a position at which the upper face 202a thereof and the upper face 201 of the port replicator 200 are in flush with each other, and a state in which the personal computer 100 is placed on the mounting base section 201 of the port replicator 200 is established.

In such a configuration as described above, if the personal computer 100 is placed solely, then the connector installation section 202 moves downwardly in response to the own weight of the port replicator 200. However, if the personal computer 100 is placed in the state in which the battery 300 is mounted thereon, then the connector installation section 202 maintains the position thereof in which it is biased by the compression coil spring 230. Accordingly, the user itself need not set the position of the connector installation section 202. Consequently, only by placing the personal computer 100 solely or placing the personal computer 100 on which the battery 300 is mounted on the port replicator 200, the connector 102 and the connector 204 can be connected to each other.

As described above, with the second embodiment, the connector installation section 202 is biased in an upward direction by the compression coil spring 230. Therefore, if the personal computer 100 in a state in which the battery 300 is mounted thereon is placed on the port replicator 200, then the connector installation section 202 is inserted into the opening 306 of the battery 300, and consequently, the connector 102 and the connector 204 can be connected to each other. On the other hand, if the personal computer 100 is placed solely on the port replicator 200, then the connector 102 and the connector 204 are connected to each other and the compression coil spring 230 is compressed by the own weight of the personal computer 100. Consequently, the upper face 202a of the connector installation section 202 is moved down to the position of the upper face 201 of the port replicator 200, and consequently, the personal computer 100 can be placed on the upper face 201 of the port replicator 200.

3. Third Embodiment

Now, a third embodiment of the disclosed technology is described. FIGS. 12A and 12B show a configuration of an electronic apparatus system according to the third embodiment as viewed from the right side. More particularly, FIG. 12A shows the electronic apparatus system in the case where a personal computer 100 in the state in which a battery 300 is mounted thereon is placed on a port replicator 200, and FIG. 12B shows the electronic apparatus system in the case where the personal computer 100 is placed solely on the port replicator 200.

In the third embodiment, a motor or actuator 240 for driving the connector installation section 202 to move upwardly and downwardly is provided. Further, a sensor section 250 is provided on an upper face of the port replicator 200 while a sensor section 350 is provided on a lower face of the battery 300.

As seen from the left side figure in FIG. 12A, in a state in which the personal computer 100 or the battery 300 is not placed on the upper face of the port replicator 200, the connector installation section 202 is positioned at a lowermost position. If the port replicator 200 is placed in a state in which the battery 300 is mounted on the personal computer 100 as seen in the central figure of FIG. 12A, then the sensor section 250 detects the sensor section 350. Consequently, it is detected by the sensor section 250 of the port replicator 200 that the battery 300 is placed on the port replicator 200.

If it is detected that the battery 300 is placed on the port replicator 200, then the motor 240 is driven to move the connector installation section 202 in an upward direction as seen from the right side figure of FIG. 12A. Consequently, the connector installation section 202 moves up by an amount corresponding to the thickness of the battery 300, whereupon the connector installation section 202 is inserted into the opening 306 of the battery 300 to connect the connector 102 of the personal computer 100 and the connector 204 of the port replicator 200 to each other. It is to be noted that the mechanism for driving the connector installation section 202 is configured such that a worm wheel is provided on a driving shaft of the motor 240 while a worm gear is provided on the connector installation section 202 such that the connector installation section 202 is driven to move upwardly or downwardly by rotation of the motor 240.

On the other hand, if the personal computer 100 on which the battery 300 is mounted is removed from the port replicator 200, then since the sensor section 250 does not detect the sensor section 350 any more, the port replicator 200 detects that the battery 300 is removed. Consequently, the motor 240 is driven to move the connector installation section 202 in the downward direction. Consequently, the connector installation section 202 is moved down to its lowermost position shown in the left side figure of FIG. 12A.

Now, operation when the personal computer 100 is placed solely on the port replicator 200 is described with reference to FIG. 12B. In a state in which the battery 300 is not placed on the upper face 201 of the port replicator 200 as seen from the left side figure of FIG. 12B, since the sensor section 250 does not detect the sensor section 350, the connector installation section 202 is positioned at a lowermost position. If the personal computer 100 is placed solely on the personal computer 100, then the connector 102 and the connector 204 are connected to each other. Also in this state, since the sensor section 350 is not provided on the bottom face of the personal computer 100, the sensor section 250 of the port replicator 200 does not detect the sensor section 350. Accordingly, the connector installation section 202 is not driven to move by the motor 240, and the connector installation section 202 assumes the lowermost position as seen from the right side figure of FIG. 12B. Consequently, the personal computer 100 is placed on the upper face 201 of the port replicator 200. It is to be noted that the type and the position of the sensor sections 250 and 350 are not restricted particularly, and any sensor may be used only if it can be detected that the battery 300 is mounted on the personal computer 100. For example, an optical sensor, a magnetic sensor and so forth can be used.

It is to be noted that, in the second and third embodiments, the configuration of the ground terminals and the ground pins for obtaining a ground potential is similar to that in the first embodiment.

As described above, with the third embodiment, if the personal computer 100 in the state in which the battery 300 is mounted thereon is placed on the port replicator 200, then the sensor section 250 detects the sensor section 350 and the connector installation section 202 is moved up. Consequently, the connector installation section 202 is inserted into the opening 306 of the battery 300 to allow the connector 102 and the connector 204 to be connected to each other.

On the other hand, if the personal computer 100 is placed solely on the port replicator 200, then since the sensor section 250 does not detect the sensor section 350, the connector installation section 202 is maintained at the original position. Accordingly, it is possible to place the personal computer 100 on the port replicator 200 in the state in which the connector 102 of the personal computer 100 and the connector 204 of the port replicator 200 are connected to each other.

It is to be noted that, while, in the embodiments described hereinabove, the connector installation section 202 is inserted into the opening 306 of the battery 300, the configuration is not limited to this. For example, a cutaway shape may be provided at a side portion of the battery 300 such that the connector installation section 202 is inserted into the cutaway shape. Or, the battery 300 may be configured smaller than the personal computer 100 such that the connector installation section 202 is moved upwardly or downwardly toward and away from the bottom face of the personal computer 100 which is not covered with the battery 300.

It should be understood by those skilled in the art that various modifications, combinations, sub-combinations and alterations may occur depending on design requirements and other factors in so far as they are within the scope of the appended claims or the equivalents thereof.

What is claimed is:

1. A function expanding apparatus, comprising:
    a mounting base section adapted to receive an information processing apparatus, wherein the information processing apparatus is placed on the mounting base section with or without a battery mounted on a bottom face of the information processing apparatus;
    a first connector, wherein the first connector moves to a first position in response to presence of the battery on the bottom face of the information processing apparatus until the first connector is connected to the information processing apparatus, wherein the first connector moves to a second position in response to absence of the battery on the bottom face of the information processing apparatus until the first connector is connected to the information processing apparatus; and
    a ground pin on the mounting base section, wherein the ground pin is in contact with a ground terminal of the information processing apparatus when the battery is not mounted on the information processing apparatus, and wherein the ground pin is in contact with a ground terminal of the battery when the battery is mounted on the information processing apparatus.

2. The function expanding apparatus according to claim 1, further comprising:
    an actuator adapted to move the first connector; and
    a sensor adapted to detect whether or not the battery is mounted on the information processing apparatus;
    the actuator moving, when it is detected by the sensor that the battery is mounted on the information processing apparatus, the first connector until the first connector is connected to the information processing apparatus.

3. The function expanding apparatus according to claim 1, further comprising an operation section adapted to move the first connector in response to an operation performed by a user.

4. The function expanding apparatus according to claim 1, further comprising
    a spring adapted to bias the first connector in an upward direction, wherein
    the first connector is connected, when the information processing apparatus in a state in which the battery is mounted thereon is placed on the mounting base section, to the information processing apparatus in a state in which the first connector is biased in the upward direction by the spring, but is moved, when the information processing apparatus is placed solely on the mounting base section, downwardly by own weight of the information processing apparatus and is connected to the information processing apparatus.

5. The function expanding apparatus according to claim 1, wherein the battery has an opening provided at a position corresponding to the first connector, wherein the first connector is connected through the opening of the battery to the information processing apparatus when the information processing apparatus mounted with the battery is placed on the mounting base section.

6. An electronic apparatus system, comprising:
    a function expanding apparatus comprising:
        a mounting base section adapted to receive an information processing apparatus placed with or without a battery mounted on the information processing apparatus;
        a first connector, wherein the first connector moves to a first position in response to presence of the battery on the bottom face of the information processing apparatus until a second connector of the information processing apparatus is electrically connected to the first connector, wherein the first connector moves to a second position in response to absence of the battery on the bottom face of the information processing apparatus until the second connector of the information processing apparatus is electrically connected to the first connector; and
        a ground pin on the mounting base section, wherein the ground pin is in contact with a ground terminal of the information processing apparatus when the battery is not mounted on the information processing apparatus, and wherein the ground pin is in contact with a ground terminal of the battery when the battery is mounted on the information processing apparatus; and
    the information processing apparatus comprising:
        the second connector provided on a bottom of the information processing apparatus;
        the ground terminal of the information processing apparatus; and
        the battery adapted to be mounted on the bottom of the information processing apparatus.

7. The electronic apparatus system according to claim 6, wherein the function expanding apparatus further includes:
    an actuator adapted to move the first connector; and
    a sensor adapted to detect whether or not the battery is mounted on the information processing apparatus;
    the actuator moving, when it is detected by the sensor that the battery is mounted on the information processing apparatus, the first connector until the first connector is connected to the second connector.

8. The electronic apparatus system according to claim 6, wherein the function expanding apparatus further comprises an operation section adapted to move the first connector in response to an operation performed by a user.

9. The electronic apparatus system according to claim 6, wherein the function expanding apparatus further includes a spring adapted to bias the first connector in an upward direction, and
the first connector is connected, when the information processing apparatus in a state in which the battery is mounted thereon is placed on the mounting base section, to the second connector in a state in which the first connector is biased in the upward direction by the spring, but is moved, when the information processing apparatus is placed solely on the mounting base section, downwardly by own weight of the information processing apparatus and is connected to the second connector.

10. The electronic apparatus system according to claim 6, wherein the battery mounted on the information processing apparatus has an opening provided at a position corresponding to the second connector, wherein the first connector is connected to the second connector through the opening of the battery when the information processing apparatus is placed on the mounting base section.

11. The electronic apparatus system according to claim 6, wherein the battery is mounted on the information processing apparatus, wherein the first connector is connected through an opening of the battery to the second connector of the information processing apparatus by moving the first connector in an upward direction by an upward projection height, wherein the upward projection height of the first connector corresponds to a thickness of the battery.

12. The electronic apparatus system according to claim 6, wherein the battery has an area corresponding to a bottom area of the information processing apparatus, wherein the battery has an opening provided at a position corresponding to the first connector, wherein the battery is mountable on the information processing apparatus.

13. The function expanding apparatus according to claim 1, wherein the battery is mounted on the information processing apparatus, wherein the first connector is connected through an opening of the battery to the information processing apparatus by moving the first connector in an upward direction by an upward projection height, wherein the upward projection height of the first connector corresponds to a thickness of the battery.

14. The function expanding apparatus according to claim 1, wherein the battery has an area corresponding to a bottom area of the information processing apparatus, wherein the battery has an opening provided at a position corresponding to the first connector, wherein the battery is mountable on the information processing apparatus.

15. The function expanding apparatus according to claim 1, wherein the ground pin of the mounting base section corresponds to the ground terminal on a bottom face of the battery facing the mounting base section, wherein a ground pin on an upper face of the battery corresponds to the ground terminal of the information processing apparatus, wherein the ground terminal on the bottom face of the battery is electrically connected to the ground pin on the upper face of the battery, wherein the ground pin of the battery is in contact with the ground terminal of the information processing apparatus.

* * * * *